United States Patent
Tatat

[11] Patent Number: 5,892,873
[45] Date of Patent: Apr. 6, 1999

[54] OPTICAL CABLE WITH EXTRUDED PERIPHERAL REINFORCEMENTS

[75] Inventor: Olivier Tatat, Houilles, France

[73] Assignee: Alcatel Alsthom Compagnie Generale D'Electricite, Paris, France

[21] Appl. No.: 784,472

[22] Filed: Jan. 17, 1997

[30] Foreign Application Priority Data

Jan. 19, 1996 [FR] France .................................. 96 00586

[51] Int. Cl.⁶ .................................................. G02B 6/44
[52] U.S. Cl. ............................................................ 385/107
[58] Field of Search ................... 385/100–113, 141, 385/147, 128, 123, 127; 427/416, 407.1; 264/174, 1.5

[56] References Cited

U.S. PATENT DOCUMENTS

| | | | |
|---|---|---|---|
| 4,082,423 | 4/1978 | Glista et al. | 385/100 |
| 4,814,133 | 3/1989 | Matsuno et al. | 264/174 |
| 4,876,051 | 10/1989 | Campbell et al. | 264/127 |
| 5,182,784 | 1/1993 | Hager et al. | 385/128 |

FOREIGN PATENT DOCUMENTS 0141723  5/1985  European Pat. Off. .

*Primary Examiner*—Akm E. Ullah
*Attorney, Agent, or Firm*—Sughrue, Mion, Zinn, Macpeak & Seas, PLLC

[57] ABSTRACT

An optical cable has a core containing optical fibers, non-metallic peripheral reinforcements to armor the cable and a thermoplastics material outer sheath. It is fabricated by a method including successive steps of applying reinforcements to the core, extruding the sheath over the reinforcements and cooling the cable. The reinforcements are extruded onto the core as it moves through a first extruder. The combination of the core and the reinforcements is then cooled in a first cooling tank. The sheath is extruded in a second extruder downstream of the first, after which the cable is cooled in a second cooling tank downstream of the first.

7 Claims, 1 Drawing Sheet

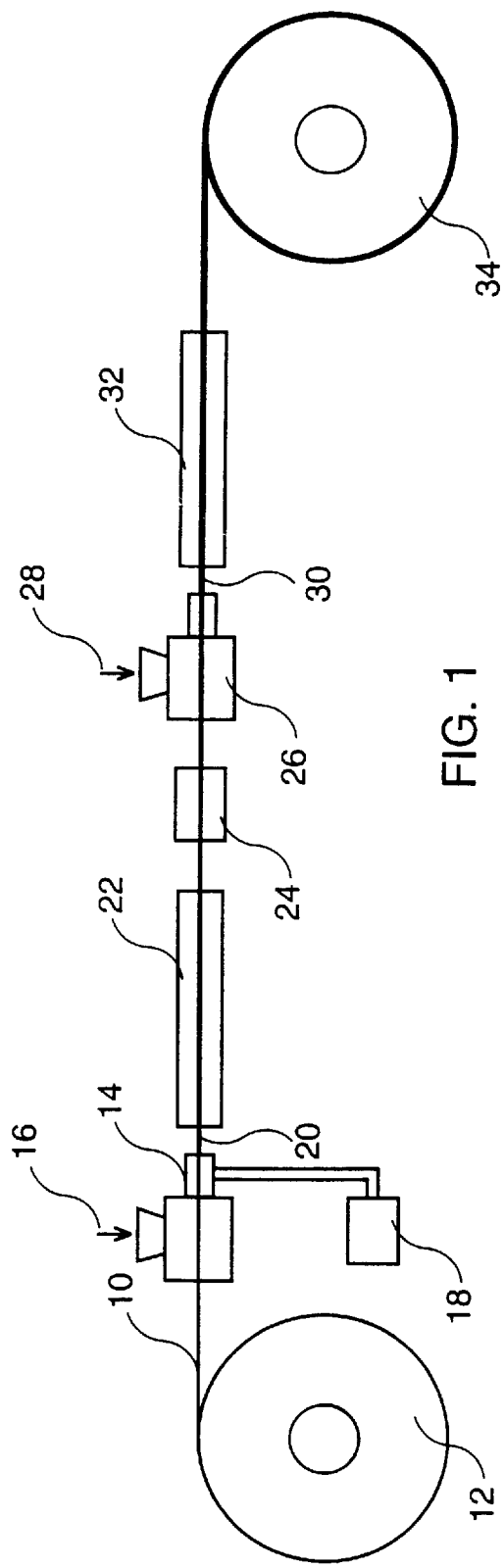
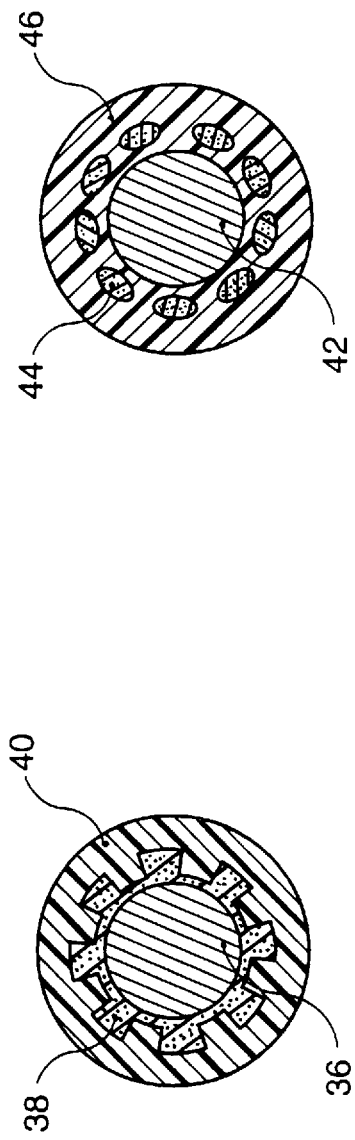
FIG. 1
FIG. 2
FIG. 3

OPTICAL CABLE WITH EXTRUDED PERIPHERAL REINFORCEMENTS

BACKGROUND OF THE INVENTION

1. Field of the Invention

The present invention concerns dielectric optical cables of the type having a core containing the optical fibers and peripheral reinforcements adapted to serve as armoring of the cable, together with a method of fabricating such cables.

2. Description of the Prior Art

Current optical cables, and principally buried dielectric cables, are armored with glass fibers or with reinforcements obtained by pultrusion so as to give them high resistance to traction and to crushing and to protect them from rodents in the case of buried cables. The reinforcements are made from a cross-linkable (heat setting) resin reinforced with long glass fibers (rovings). They are installed in the cable by means of a rotating cage, which is a slow operation that cannot be conducted in series with the extrusion of the sheath covering the cable.

Apart from the fact that the raw material used to obtain pultruded reinforcements is costly, a cable made in this manner has greater resistance to traction than it needs and that is not justified when it is to be buried.

Document EP-A-0 141 723 discloses an optical cable containing no metal materials and the central core of which comprising optical fibers is surrounded by an extruded protective tubular coating, an armoring and an extruded outer sheath. The armoring is made up of high mechanical strength wires that are laid up onto the protective coating or of fibers that do not have any resistance to compression that are disposed around the coating and stiffened by a binder.

The speeds at which the protective coating is extruded, the reinforcements are applied and the external sheath is extruded are made identical, which results in a relatively slow manufacturing process, quite apart from the fact that it is somewhat complex.

For this reason the aim of the invention is to provide an optical cable in which the reinforcements serving as armoring of the cable are extruded during fabrication of the cable.

Another aim of the invention is to provide a method of fabricating an optical cable that does not require a separate operation to apply the reinforcements.

SUMMARY OF THE INVENTION

In one aspect, the invention therefore consists in a method of continuous fabrication of an optical cable comprising a core containing optical fibers, non-metallic peripheral reinforcements to armor said cable and a thermoplastics material outer sheath, said method including successive steps of applying reinforcements to said core by extruding said reinforcements onto said core as it moves through a first extruder, cooling the combination of said core and said reinforcements in a first cooling tank, extruding said sheath over said reinforcements in a second extruder downstream of said first extruder, and cooling said cable in a second cooling tank downstream of said first cooling tank.

In a second aspect, the invention consists in an optical cable comprising a core containing optical fibers, non-metallic peripheral reinforcements for armoring said cable made from a thermoplastic resin containing short glass fibers and extruded directly into place on said core, and a thermoplastics material outer sheath.

The aims, objects and features of the invention will be more clearly understood from a reading of the following description given with reference to the accompanying drawings.

BRIEF DESCRIPTION OF THE DRAWINGS

FIG. 1 is a diagram showing a method of fabricating an optical cable of the invention in which the reinforcements and the outer sheath are extruded continuously.

FIG. 2 is a cross-section view of an optical cable obtained using a grooved extrusion die.

FIG. 3 is a sectional view of an optical cable obtained using an extrusion die with multiple holes.

DETAILED DESCRIPTION OF THE PREFERRED EMBODIMENTS

In the fabrication method shown in FIG. 1, the core 10 of the cable that contains the optical fibers is paid off from a feed spool 12 into an extrusion machine fitted with an extrusion die 14. The extrusion machine is fed with the material 16 used to make the reinforcements of the cable, namely thermoplastic (for example polyamide) resin loaded with short glass fibers, i.e. glass fibers having a length less than about 5 mm. The material used to obtain the reinforcements is, for example, the material manufactured in various versions by EMS and sold under the trade name Grivory GV, containing 20% to 60% short glass fibers.

The extrusion die 14 is preferably rotated by a drive motor 18 so that the reinforcements are extruded in a helix arrangement, which reduces the stiffness of the cable and its minimum radius of curvature and increases its resistance to crushing.

The cable 20 comprising the core and the reinforcements formed by the extrusion die 14 is cooled in a cooling tank 22 and then dried in a drier 24 before it is fed to an extruder fitted with an extrusion die 26. This is fed with the material 28 of the outer sheath of the optical cable, which is generally a thermoplastic resin, usually of the high-density polyethylene type.

The final optical cable 30 made up of the core, the reinforcements and the outer sheath is cooled in a cooling tank 32 before it is wound onto a take-up spool 34.

The extrusion die 14 that forms the reinforcements in the cable may be an annular fixed die, in which case the reinforcement is of annular form. However, it is preferable to use a grooved extrusion die or an extrusion die with holes. In the case of a grooved die, the cable obtained has the cross-section shown in FIG. 2, i.e. with a core 36 surrounded by reinforcements that comprise the crests 38 of a crenellated ring produced by the grooves of the extrusion die, and an outer sheath 40. If the extrusion die 14 is a die with holes, the cable obtained has the cross-section shown in FIG. 3, i.e. with a core 42 surrounded by reinforcements 44 in the form of separate strands and an outer sheath 46.

As previously indicated, the extrusion die used for extruding the reinforcements, whether it is a grooved die or a die with holes, is preferably rotated so that the reinforcements are applied in the form of a helix around the core.

As already mentioned, the optical cables obtained by use of the present invention are preferably used as buried dielectric cables in which case high resistance to crushing and to rodents is required, without this necessitating an armoring made up of pultruded reinforcements, the latter producing cables which have a greater resistance to traction than is required.

There is claimed:

1. An optical cable comprising:

a core containing optical fibers;

non-metallic peripheral reinforcements for armoring the cable, said reinforcements being made from a thermoplastic resin containing short glass fibers, said fibers having a length less than about 5 millimeters, said reinforcements being extruded directly into place on said core; and a thermoplastics material outer sheath.

2. The optical cable claimed in claim 1 wherein said reinforcements form a crenellated ring.

3. The optical cable claimed in claim 1 wherein said reinforcements comprise separate strands.

4. The optical cable claimed in claim 1 wherein said reinforcements are in the form of a helix around said core.

5. The optical cable claimed in claim 2 wherein said reinforcements are in the form of a helix around said core.

6. The optical cable claimed in claim 3 wherein said reinforcements are in the form of a helix around said core.

7. Any application of the optical cable as claimed in claim 5 wherein said optical cable is a cable adapted to be buried.

* * * * *